Figure 1:
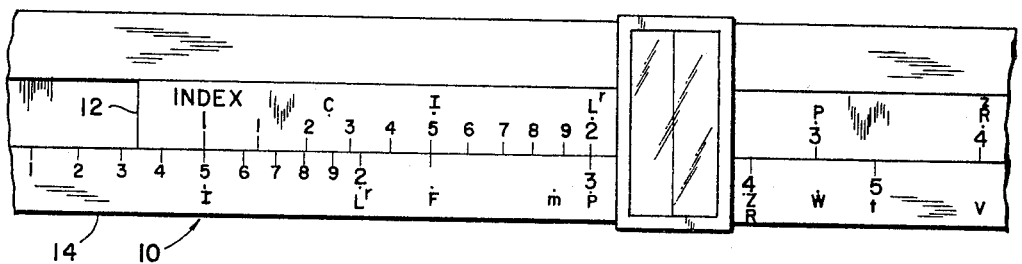

Nov. 1, 1966

A. B. PIKUS 3,282,500

CALCULATING DEVICE FOR SOLVING UNKNOWN
QUALITATIVE PARAMETERS

Filed Aug. 11, 1965

INVENTOR.
ALFRED B. PIKUS

BY

Morgan, Finnegan, Durham & Pine
ATTORNEYS

United States Patent Office 3,282,500
Patented Nov. 1, 1966

3,282,500
CALCULATING DEVICE FOR SOLVING UNKNOWN QUALITATIVE PARAMETERS
Alfred B. Pikus, Oaklyn, N.J., assignor to Keuffel & Esser Company, Hoboken, N.J., a corporation of New Jersey
Filed Aug. 11, 1965, Ser. No. 478,864
7 Claims. (Cl. 235—70)

This application is a continuation-in-part of co-pending application Serial No. 260,988, filed February 26, 1963, by Alfred B. Pikus, for "Calculating Device for Solving Unknown Qualitative Parameters," now abandoned.

This invention relates to calculating devices and methods, and more particularly to such devices and methods for solving for unknown qualitative parameters.

Calculating devices, such as slide rules, in which two or more known quantities are utilized to determine an unknown quantity are well known. Such devices are generally used to facilitate the multiplication or division of known quantities to arrive at the product or the quotient. While such devices undoubtedly serve useful purposes in the engineering and scientific fields, most such devices are generally limited to calculations involving quantitative parameters.

In many cases, persons reading an engineering or scientific article encounter a highly complex mathematical equation or formula. Very often, the person reading the article is interested in knowing the qualitative parameters of the equation involved and not the precise quantitative functions. However, in order to arrive at the unknown qualitative parameters, it is necessary to take the steps to solve the equation involved quantitatively.

Very often, persons reading technical articles are not highly skilled mathematicians and the articles involving complex equations become completely non-understandable. Many text books must be disgarded by teachers who are interested in teaching broad qualitative theories because the inclusion of such complex equations therein is far beyond the understanding of their students.

It is an object of this invention to provide a relatively simple method and means for solving qualitatively complex mathematical formulas.

It is a further object of this invention to provide a relatively simple method and means wherein persons with limited mathematical backgrounds are able to solve qualitatively complex mathematical equations.

It is still a further object of this invention to provide a relatively simple method and means for simplifying complex terminology used in technical fields.

It is still a further object of this invention to provide a relatively simple method and means for eliminating many complications in complex mathematical equations where constants are given qualitative values.

It is still a further object of this invention to provide a novel method and means for setting up mathematical equations rapidly and accurately.

It is a further object of this invention to provide an improved calculating device in which two known qualities may be compared to arrive at an unknown quality.

It is an object of this invention to provide a novel device for determining an unknown quality from two or more known qualities.

It is an object of this invention to verify quickly and efficiently the qualitative accuracy of an equation set up and, if the equation is worked out step by step, to be able to verify the accuracy of every step.

In accordance with the present invention, improved methods and means are provided to enable a person to simplify a relatively complex equation and to determine an unknown qualitative parameter from known qualitative parameters.

Figure 2:
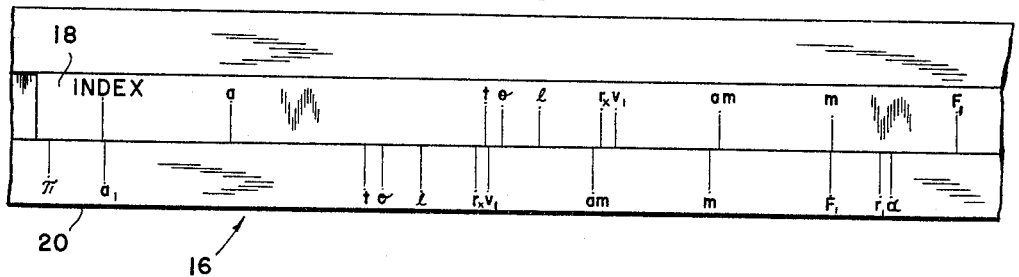
Figure 3:
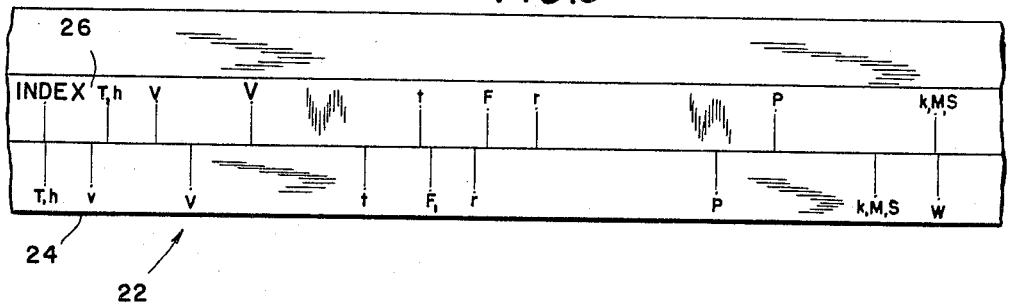

Other objects and advantages of the present invention will be apparent and suggest themselves to those skilled in the art, from a reading of the following specification and claims, in which:

FIGURE 1 illustrates a calculating device involving qualitative electrical and magnetic parameters, and FIGURE 2 is another embodiment of the present invention involving qualitative parameters related to the mechanical field, and FIGURE 3 is another embodiment of the present invention relating to the heat field.

Before describing the actual devices involving the present invention, some of the general theory upon which the invention is based will be discussed.

Much of the present scientific knowledge is contained in, or represented by, equations relating the physical qualities (qualitative parameters) of interest. The two simple basic physical laws:

$$v = at \text{ and } r = vt$$

where $v$=velocity, $a$=acceleration, $t$=time, and $r$=distance or length, are examples of such equations.

In a given situation, the knowledge of the values of a certain number of physical observables will determine others—the values expressed in terms of numbers and dimensional units. If instead of merely letting the value and dimension of a physical quality be determined for a particular problem at hand, the physical qualities could be related through a numbering system which would remain constant throughout any problem within a large class, many calculations and operations involving the physical qualities, both numerically and dimensionally, would be simplified.

Physical qualities (qualitative parameters) such, for example, as the usual basic parameters: mass, length, time, and charge, can be "related" or "ranked" by the assigning to each physical quality of a number—the number being determined by the relationship among the physical qualities (the physical laws) and by some chosen or pre-selected reference numbers.

The basic physical laws form a set of equations which may be considered as a set of simultaneous equations. For example, the above mentioned two simple basic physical laws:

$$v = at \text{ and } r = vt$$

These simultaneous equations can be rearranged and combined in the form:

$$\left(a - \frac{v}{t}\right)\left(t - \frac{r}{v}\right) = 0$$

It is to be noted that, although there are four physical qualities given, namely, $v$, $a$, $t$, and $r$, there are only two equations. Hence, two of these four physical qualities must be pre-selected in order to determine the other two. Thus, if $v$ is pre-selected by being arbitrarily assigned the numerical value $3 \times 10^8$ (corresponding to the numerical value of the velocity of light in meters per second), and $r$ is pre-selected by being arbitrarily assigned the numerical value 1, then $a$ must have the numerical value $9 \times 10^{16}$, and $t$ must have the numerical value $.33 \times 10^{-8}$. This simple case yields the table of numbers or numerical values:

$$v = 3 \times 10^8$$
$$r = 1$$
$$a = 9 \times 10^{16}$$
$$t = .33 \times 10^{-8}$$

If the procedure is continued, considering as many physical qualities as desired, a table of numbers or numerical values corresponding to each of the physical qualities considered, can be constructed.

The numbers must be consistent with all physical laws in the original set or those derived from them. This will not be true when an equation is for a specific geometry or special configuration and not a general or basic relation. In addition, there might be different tables developed when different systems of units such, for example, as the M.K.S. system, the c.g.s. system or the f.p.s. system, are employed, or when a basic physical quality can be expressed in different terms. For example, a force F may be expressed in terms of different qualities depending upon whether the force is gravitational, electromagnetic, weak nuclear, strong nuclear, etc. Each type of force may generate different tables, but these tables will be consistent within the system of equations pertaining to that type of force.

Just as in the case of real numbers—where, for example, with the three numbers 1, 3, and 7, one can generate an infinite number of new numbers such as ⅓, 49, 10 etc., from the four illustrative physical qualities or qualitative parameters $v$, $r$, $t$, and $a$, one can generate an infinite number of combinations. For example, in $F=ma$, the ratio $F/m$ must have the numerical value $9 \times 10^{16}$, the number corresponding to $a$ above. In fact, any combination of physical qualities which yields $a$ will necessarily give the number $9 \times 10^{16}$.

It is important to note that if the original set of equations is consistent, then there will be a unique and different number or numerical value for each physical quality. Certain physical qualities such, for example, as work and torque, both of which are products of force and distance (one a vector cross product and the other a vector dot product), will have the same number in the table.

Once each physical quality is given a number or numerical value, it is no longer necessary to consider the dimensions and units of the quality, since the number corresponding to a physical quality will stand for only that quality in the units employed in the original equations, and no other. The constants, both numerical and dimensional, in the equations will be included also as numbers. Thus, a table can be generated, giving a number for each physical quality, with the numbers for the natural constants selected as their actual values, and certain of the physical qualities or qualitative parameters— say length, charge, velocity, mass etc. chosen or preselected as particular significant values. For example, the number for the physical quality, "charge," might logically be selected as $1.6 \times 10^{-19}$. Since no other physical quality would have that number, the unit "coulomb" would not be needed. Whenever the number $1.6 \times 10^{-19}$ appears, it is charge.

Similarly, the number pre-selected for the physical quality "mass" advantageously might be that corresponding to the mass of an electron i.e. $9.108 \times 10^{-31}$ kilograms or, if desired, to the mass of a proton, i.e. $1.672 \times 10^{-27}$. In general, a number pre-selected for a given physical quality appearing in physical equations (laws) to be solved simultaneously for the determination of an unknown physical quality is, in a physical sense, equivalent to specific known physical values.

There are many equations which relate the physical qualities, but any one equation relates only a limited number of them. If $n$ physical qualities are to be related, and if $m$ of them are pre-selected (considered as basic), such, for example, as the speed of light, the mass of the electron or of a proton, or some other basic qualitative parameter, then $n-m$ independent equations equating the $n$ physical qualities are required.

If $n$ physical laws are combined and rearranged in the form:

$$a_0(x_1-a_1)^\alpha (x_2-a_2)^\beta (x_3-a_3)^\gamma \cdots (x_n-a_n)^\eta = 0 \quad (1)$$

where the $x$'s are the various physical qualities of interest, then the $a$'s are the values of each quality which satisfy Equation 1. Each physical quality $x_m$ is assigned the number $a_m$, etc.

The present invention involves some of the techniques used in connection with the conventional slide rule. For example, in a conventional slide rule, indicia relating to quantities or numerical values are included on a pair of elements which are slidably mounted with respect to each other. The indicia are generally displayed in the form of logarithmic scales.

Two of the scales which are generally used in the conventional slide rule and which involve multiplication and division of numbers are commonly referred to as the C and D scales. Each of the scales includes indexes, generally at the beginning or end position of the scales.

To perform a multiplication of two numbers in a conventional slide rule, the first number to be multiplied (the multiplicand) is first located on the D scale, generally on the lower of the two slidable elements. The slide or element including the C scale is then moved until one of the indexes (usually the nearest index) of the C scale is opposite this first number.

A glass indicator, again included on a conventional slide rule, is moved until its cross hair is at the location of the second number (the multiplier) on the C scale.

The answer may then be read under the cross hair on the D scale.

To perform a division with a conventional slide rule, the dividend (the number to be divided) is found on the D scale. The indicator is then moved until the cross hair is at this number.

The slide, or inner element containing the C scale, is moved until the divisor is under the cross hair.

The answer is then read on the D scale opposite the index of the C scale.

In the prior art of slide rules the indicia which constitute the scales represent *numerical* quantities. The value assigned to each of the indicia on a given scale can be specified explicitly by a single continuous (or piecewise continuous) mathematical function of the position of the indicia with respect to some coordinate frame of reference on the slide rule itself. In cases in which multiple values are assigned to each of the indicia (as in the case of conventional trigonometric "S" and "T" scales), the multiple values can be derived from a corresponding multiplicity of functions of position (seldom, if ever, more than two). Conversely, the position of the indicia on a given scale can be specified explicitly by a single continuous (or piecewise continuous) mathematical function of the values assigned to the indicia.

In the present invention, on the other hand, the indicia represent essentially *non-numerical* entities ("qualities"). Although numerical values may be assigned to the indicia, the meaning of the indicia on a given scale is not related to the values of any single continuous (or piecewise continuous) mathematical function of the position of the indicia. Furthermore, positions may be assigned in an essentially arbitrary manner to certain indicia (representing "independent" qualities), and in order to explicitly determine the locations of the remaining indicia (representing "dependent" qualities) a separate mathematical relation is required for each of the remaining indicia.

The present invention as embodied in a qualitative slide rule rests upon the formal mathematical similarity between certain numerical relationships on the one hand and certain non-numerical relationships on the other hand. Therefore, although the method of locating the indicia and the meaning of the indicia are novel, the manipulation of the qualitative slide rule is easily understood by one accustomed to performing numerical calculations on a conventional slide rule.

As a first example of non-numerical entities which may be employed in a qualitative slide rule in accordance with this invention, one may take "dimensions" of physical measurements, e.g., "length," "time," "velocity," "charge," "inductance," "pressure," etc. In a formal way the non-numerical relationship:

$$\text{Velocity} = \frac{\text{length}}{\text{time}}$$

is similar to the numerical relationship:

$$3 = \frac{6}{2}$$

yet the concepts of "length," "time" and "velocity" are certainly not themselves numbers.

Because of this formal similarity, one could arbitrarily assign the value 6 to "length" and the value 2 to "time." The value which must then be assigned to "velocity" to preserve the formal similarity to numerical quantities, is 3. In this case if the indicia normally labeled "6," "3," and "2" on the "C" and "D" scales of a conventional slide rule were labeled "length," "time" and "velocity" (or simply "$l$," "$t$" and "$v$") respectively, the mathematical relationships among "length," "time" and "velocity," namely, $$\text{Velocity} = \frac{\text{length}}{\text{time}}$$

$$\text{Time} = \frac{\text{length}}{\text{velocity}}$$

$$\text{Length} = \text{velocity} \times \text{time}$$

would all appear formally correct when the operations of "multiplication" and "division" were performed in the manner normally used on a conventional slide rule.

Proceeding further with this example, the dimension of "area" (i.e., length$^2$) would be located at the position normally representing 36 on conventional "C" and "D" scales. Similarly, the dimension "$\sqrt{\text{length}}$" would be located at the position normally representing $\sqrt{6}$ on conventional "C" and "D" scales, or alternatively at the position representing 6 on conventional "A" and "B" scales. "Mass," being independent of "length," "time" and "velocity," could be located arbitrarily, for example, at the position normally representing 5 on conventional "C" and "D" scales. Then, since $$\text{energy} = \text{mass} \times (\text{velocity})^2$$

"energy" would necessarily be located at the position normally representing 45 on conventional "C" and "D" scales, etc.

In general, any set of dimensions which are mathematically mutually independent may be assigned numerical values in an essentially arbitrary manner. The dimensions of "length," "mass," "time," "charge," "temperature" and "luminous intensity" are normally considered to be fundamental (in the M.K.S. system of measure) but any mathematically mutually independent set of dimensions will suffice. The values to be assigned to all dependent dimensions must then be determined by simultaneously solving all relevant defining equations, e.g., $$\text{Velocity} = \frac{\text{length}}{\text{time}}$$

$$\text{Resistance} = \frac{\text{voltage}}{\text{current}}$$

$$\text{Force} = \text{mass} \times \text{acceleration}$$

in order to express the dependent dimensions etc. in terms of those dimensions which have been chosen as the mutually independent set.

The notions of "mutual independence" and "mutual dependence" are in common mathematical usage and require no further elaboration here except to note that dimensions which may be independent in one system of measure may be dependent in another system of measure. For example, in the M.K.S. system of measure $$\text{Force} = \frac{(\text{charge})^2}{\text{permittivity} \times (\text{length})^2}$$

whereas in the c.g.s. system of measure $$\text{Force} = \frac{(\text{charge})^2}{(\text{length})^2}$$

with the result that "charge" is considered to be independent of all mechanical dimensions in the M.K.S. system of measure whereas in the c.g.s. system of measure it is not. A qualitative slide rule for dimensional analysis is therefore generally useful only within a given system of measure.

It should be noted that all numerical constants are to be ignored in dimensional calculations of this type, thus (in the M.K.S. system of measure), $$\text{Force} = \frac{(\text{charge})^2}{\text{permittivity} \times (\text{length})^2}$$

not $$\text{Force} = \frac{(\text{charge})^2}{4\pi \times \text{permittivity} \times (\text{length})^2}$$

This is analogous to the fact that dimensions are ignored in carrying out the actual numerical slide rule calculations among physical quantities.

It should also be noted that whereas the independent dimensions may be located in an essentially arbitrary manner, there are certain advantages to be gained by locating them with some care. Firstly, it is desirable in order to avoid ambiguity that the indicia for different dimensions should not coincide too closely with one another. Certain choices for the positions of the independent dimensions will be found to give more suitable spacing to the indicia than that which results from certain other choices. Secondly, on a slide rule containing conventional numerical scales as well as dimensional scales, it is sometimes a convenience if certain indicia are located at numerical values which appear frequently in numerical calculations. For example, the dimension "permittivity" may be located opposite the value of "the permittivity of free space" (in the M.K.S. system) on the "C" and "D" scales. In this case it may appropriately be denoted by "$\epsilon_0$" and may be used whenever the numerical value for "$\epsilon_0$" is required.

A dimensional slide rule of the type heretofore described can readily provide useful and non-obvious results. It can, for example, quickly answer such questions as:

(a) Is $LC$, $\frac{1}{LC}$, $\sqrt{LC}$ or $\frac{1}{\sqrt{LC}}$ a time constant?

(b) Is it true that $\frac{\text{permittivity} \times (\text{voltage})^2}{\text{acceleration}} = \text{mass}$?

Furthermore, it is useful in arriving at dimensionless combinations of factors, a step frequently employed in dimensional analysis.

As a second example of non-numerical entities which may be represented by the indicia on qualitative slide rule, one may take the symbols representing algebraic quantities which appear in any set of simultaneous algebraic equations involving only the algebraic operations of multiplication, division and exponentiation (integral or fractional). When explicit numerical values (e.g., ½, $2\pi$) appear in such equations in addition to symbols for quantities of unstated magnitude, the indicia for the explicit numerical values may be assigned the positions they would have on conventional "C" and "D" scales. The procedure for determining the positions of the indicia is otherwise the same as that in the example given of a dimensional slide rule.

One of the advantages of the present invention is that it makes use of slide rule techniques which are already well known by thousands of people in the engineering, scientific and mathematical fields. However, the present invention deals with qualitative parameters rather than with numbers or quantities.

The conventional slide rule was made possible through the use of logarithmic scales. One the other hand, the qualitative slide rule of the present invention is made possible by the assignment of certain positions on the slide rule of certain indicia representative of qualitative parameters.

In determining the locations on the qualitative slide rule of the qualitative parameters involved, certain numbers may be assigned certain parameters. However, once these locations have been determined, the assigned numbers may be disregarded, with conventional symbols representing the parameters being used as the indicia on the qualitative slide rule.

When the indicia representative of the qualitative parameters are on the qualitative slide rule, various operations, such as multiplication and division, may be carried out in a manner similar to that used in the conventional quantitative slide rule.

For example, consider a formula $$X = \frac{E}{R}$$

in which X is the unknown and represents the qualitative parameter to be solved for. The indicia E (representing voltage) would be located on one scale, for example, the D scale included on a bottom element of a slide rule. The glass indicator may then be moved until the cross hair is at this qualitative parameter representation. The inner slide, e.g. the element with the C scale having qualitative parameter indicia thereon, may then be moved until the indicia R (representing resistance) is under the cross hair.

The answer I (representing current) can then be read on the D scale opposite the index of the C scale. Consequently, it is seen that E divided by R is qualitatively equal to I.

While the above example involving Ohm's law is somewhat elementary, nevertheless, it illustrates the principle or technique which may be employed in qualitatively solving any complex mathematic equation.

In general, it may be stated that the present invention, through the application of certain principles, is capable of simplifying highly complex mathematical equations to arrive at the answer to unknown qualitative parameters. These qualitative parameters may be in the electrical, mechanical, heat, light, atomic and other fields. Each field must be considered individually but the general principles involved in applying the present invention are the same for all fields.

Regardless of the particular fields involved, the present invention utilizes the same basic principle in determining the various order and spacing of the individual parameters or indicia on a slide rule, for example. All of the various charts and tables which are illustrated hereinafter are based on the relationship between all physical qualities, with the relationship being definable in numerical terms derived from the solution of basic mathematical formulae. One general formula which may be used in deriving the items illustrated in the tables which follow is:

$$f(x) = (x-r_1)(x-r_2) \ldots (x-r_n) = 0$$

Where $x$ which has a numerical value $r_1$ for a root, in a physical sense, is equivalent to the mass of an electron in kilograms.

Where $x$ which has a numerical value $r_2$ for a root, in a physical sense, is equivalent to the velocity of light, in meters per second, Where $x$ has numerical values from $r_3$ to $r_{n-1}$ as determined by solving physical equations (laws) simultaneously, in a physical sense is equivalent to specific known physical values.

Where $x$ has a numerical value $r_n$ for a root, in a physical sense, is equivalent to the mass in kilograms of a proton.

First consider the electrical field. The electrical field includes a number of different qualitative parameters, such as capacitance, inductance, resistance and numerous others. Generally, these parameters may be defined in terms of other parameters. For example, in simple Ohm's law, current may be defined as being equal to voltage divided by resistance. In illustrating the present invention, the qualitative parameters found in the electrical field may be assigned certain letters and numbers. The letters assigned are those conventional abbreviations generally used by those working in the electrical field. The reason for the assignment of the numbers will be apparent when the devices embodying the invention are described.

In considering the field of electricity, the various symbols which apply to different electrical units or qualities may be designated as follows:

$C$ = capacitance
$E$ = electric flux density
$F$ = force
$f$ = frequency
$H$ = magnetic field intensity
$I$ = electric current
$L$ = inductance
$p$ = magnetic pole
$\phi$ = (phi) magnetic lines
$\psi$ = (psi) electric lines
$q$ = electric charge
$r$ = radius, distance, length
$R$ = resistance
$t$ = time
$V$ = voltage
$W$ = work or energy In determining the positions of the indicia of the above qualitative parameters, the following locations were determined through the application of the foregoing principles, and were found to be suitable in the present invention. The numbers indicated are those which would be found in a conventional slide rule having logarithmic scales. In the table below numerical locations or reciprocals, square roots and other commonly used qualities are given:

*Tables relating to electrical field*
ESU UNITS

| Symbol | Number Location | Symbol | Number Location | Symbol | Number Location |
|---|---|---|---|---|---|
| $\psi = q = 9 =$ | 4.8 | $\sqrt{q} =$ | 2.19 | $q^2 =$ | 23 |
| C = | 3.0 | $\sqrt{c} =$ | 1.732 | $c^2 =$ | 9 |
| m = | 9.1 | $\sqrt{m} =$ | 3.01 | $m^2 =$ | 82.9 |
| C = r = | .282 | $\sqrt{r} =$ | .53 | $r^2 =$ | .0795 |
| t = | .094 | $\sqrt{t} =$ | .0307 | $t^2 =$ | .00884 |
| R = | .333 | $\sqrt{R} =$ | .577 | $R^2 =$ | .111 |
| L = | .0313 | $\sqrt{L} =$ | .01765 | $L^2 =$ | .00097 |
| F = | 29.0 | $\sqrt{F} =$ | 5.39 | $F^2 =$ | 842 |
| W = | 8.16 | $\sqrt{W} =$ | 2.86 | $W^2 =$ | 66.7 |
| P = | 87.0 | $\sqrt{P} =$ | 9.32 | $P^2 =$ | 7530 |
| E = | 60.3 | $\sqrt{E} =$ | 7.8 | $E^2 =$ | 3630 |
| V = | 17.0 | $\sqrt{V} =$ | 4.12 | $V^2 =$ | 289 |
| I = | 51 | $\sqrt{I} =$ | 7.15 | $I^2 =$ | 2600 |
| $f = \omega =$ | 10.63 | $\sqrt{\omega} =$ | 3.27 | $\omega^2 =$ | 112.8 |

*Tables relating to electrical field.*—Continued

EMU UNITS

| Symbol | | Number Location | Symbol | | Number Location | Symbol | | Number Location |
|---|---|---|---|---|---|---|---|---|
| $\phi = p$ | = | 4.8 | $\sqrt{p}$ | = | 2.19 | $p^2$ | = | 23 |
| c | = | 3.0 | $\sqrt{c}$ | = | 1.732 | $c^2$ | = | 9 |
| m | = | 9.1 | $\sqrt{m}$ | = | 3.01 | $m^2$ | = | 82.9 |
| L = r | = | .282 | $\sqrt{r}$ | = | .53 | $r^2$ | = | .0795 |
| t | = | .094 | $\sqrt{t}$ | = | .0307 | $t^2$ | = | .00884 |
| R | = | 3.0 | $\sqrt{R}$ | = | .577 | $R^2$ | = | .111 |
| C | = | .0313 | $\sqrt{C}$ | = | .01765 | $C^2$ | = | .00097 |
| F | = | 29.0 | $\sqrt{F}$ | = | 5.39 | $F^2$ | = | 842 |
| W | = | 8.16 | $\sqrt{W}$ | = | 2.86 | $W^2$ | = | 66.7 |
| P | = | 87.0 | $\sqrt{P}$ | = | 9.32 | $P^2$ | = | 7530 |
| B = H | = | 60.3 | $\sqrt{E}$ | = | 7.8 | $E^2$ | = | 3630 |
| V | = | 51 | $\sqrt{V}$ | = | 7.15 | $V^2$ | = | 2600 |
| I | = | 17 | $\sqrt{I}$ | = | 4.12 | $I^2$ | = | 289 |
| q | = | 1.6 | $\sqrt{q}$ | = | 1.265 | $q^2$ | = | 2.56 |
| f = $\omega$ | = | 10.63 | $\sqrt{\omega}$ | = | 3.27 | $\omega^2$ | = | 112.8 |

While a simple formula relating to Ohm's law was discussed above in illustrating the use of the qualitative slide rule of the present invention, it is realized that one of the main uses of the present invention will probably be in connection with solving qualitatively highly complex mathematical formulas.

The following formulas are given as merely some examples of formulas which may be solved. In the illustrations to follow assume that the single qualitative parameters to the right are unknown. By applying conventional slide rule techniques, i.e. by multiplying and dividing, the final position of an index will point to the unknown qualitative parameter given at the right.

*Electrical examples*

ESU $\frac{kq_1q_2}{r^2} = F$ $kq/r^2 = E$ $kq/r = V$ $V/r = E$ $Er = V$ $CV = q$ $\frac{q_1q_2}{r} = W$ $\frac{1}{2}CV^2 = W$ $qV = W$ $IVt = W$ $\frac{kp_1p_2}{r^2} = F$ $\frac{k2I}{r} = H$ $4mI = W/p$ $IrB = F$ $qvB = F$ $rvB = V$ $\frac{Fr}{q} = V$ $IR = V$ $\frac{d\phi}{dt} = V$ $I\Delta\phi = W$ $\frac{Ldi}{dt} = V$ $\frac{1}{2}LT^2 = W$ $VI = P$ $2LC = t$ $RC = t$ $\frac{L}{R} = t$ A general principle which should be recognized and may be utilized in simplifying complex formulas is that terms added to or subtracted from previous terms may be disregarded when solving for unknown qualitative parameters. The reason for this is that if a thing is added to or substracted from something else, they must be of the same quality. For example, you cannot add apples to oranges or subtract oranges from apples. Only like qualities may be added to or subtracted from each other.

Thus, if an equation includes a fraction, terms after a plus or minus sign in the numerator and denominator may be ignored since they do not affect the result qualitatively. It is true that when quantative answers are important, this method may not be employed. However, the important feature of the present invention is that it deals with qualitative and not quantitative parameters.

Referring particularly to FIGURE 1, a qualitative slide rule 10 involving electrical parameters is illustrated along with the numbers found in conventional slide rules. These numbers are shown so that it may be seen that the indicia relating to the qualitative parameters must be prelocated in a logical manner as above described, before the present invention involving the solution of qualitative parameters may be employed. As will be seen in subsequent embodiments, the qualitative slide rule of the present invention need not include the numbers. On the other hand, it is recognized that in some cases, it may be desirable to take an existing conventional slide rule and include the indicia relating to qualitative parameters to provide the advantages of the present invention.

The slide rule 10 includes a pair of elements 12 and 14. The slide rule 10 is illustrated with only the bottom scales, comparable to the C and D scales of a conventional slide rule, for the purposes of clarity. The top portions of the slide rule may of course be used, if desired, possibly to include qualitative parameters relating to the mechanical field, for example.

The element 12 is disposed to slide within the element 14 to permit alignment of the indicia of the element 12 (C scale) with the indicia of the element 14 (D scale). The indicia of both scales are identical as in a conventional slide rule.

It is noted that the indicia C, representing capacitance is located at the number location 3.0, in accordance with the table given above. Likewise, I is located at location 51, in accordance with the above table. All the qualities listed in the table above may be given appropriate symbols and located at the number locations indicated.

After the indicia relating to qualitative parameters have been properly located in accordance with the manner described and the above table, the slide rule 10 is ready for use in qualitatively solving complex mathematical formulas. Multiplication and division may be accomplished in a manner similar to that used in conventional quantitative slide rules except that the indicia relating to qualitative parameters and not numbers are involved.

It is well to remember the principle mentioned above in utilizing the present invention, i.e. that terms following plus or minus signs may generally be ignored in solving for qualitative answers.

It is noted that in the qualitative slide rule of the present invention that a symbol involving a parameter is located at only one position on each of the movable elements of the slide rule, despite the wide variety of different types of problems to be solved.

In considering the field of mechanics, the various symbols which apply are defined as follows:

$t$ = time
$r$ = distance, length
$V$ = velocity
$a$ = acceleration
$m$ = mass
$F$ = force
$W$ = work, energy
$P$ = power
$f$ = frequency
  Sub $y$ = along $y$ axis or vertical
  Sub $x$ = along $x$ axis or horizontal Sub $n$=normal or radial as on spokes of wheel going into center.
Sub $\theta$=angular
$\theta$=angle or $2\pi$ radians
$\omega$=angular velocity
$\alpha$=angular accelaration
$I$=moment of inertia
$\tau$=torque
$p$=angular impulse The device 16 of FIGURE 2 is somewhat similar in design to the device 10 of FIGURE 1 except that the device 16 is concerned with mechanical qualities rather than electrical qualities. The device 16 includes element 18 slidably disposed within the element 20.

The same principles which apply to FIGURE 1 also apply to FIGURE 2, except that the embodiment of FIGURE 2 relates to mechanical qualities or parameters. The numbers relating to the conventional slide rule have been omitted since they are unnecessary after the proper locations have been determined in accordance with the table given below.

Solving mechanical problems qualitatively introduces some problems not found in the electrical field. For example, motion and directions are involved. Different directions of motion of elements involved require the application of different rules. In considering a qualitative slide rule for mechanical problems, it is desirable to first determine the direction of movement involved. For example, a problem may involve rotary motion (non-linear), a motion towards the center of the X and Y axis (as spokes in a wheel), horizontal motion, as in the direction of the X axis, or vertical motion, as in the direction of the Y axis. Directions of motion are generally indicated in the formula under consideration or in the article or diagram with which the formula is associated. Dependent upon the direction of motion, one of the following four tables may be employed.

In locating the symbols relating to the mechanical parameters, the following tables may be employed:

*Tables relating to mechanical parameters*

ROTARY MOTION

| Symbol | Number Location | Symbol | Number Location | Symbol | Number Location |
|---|---|---|---|---|---|
| $t$ = | 2.0 | $\sqrt{t}$ = | 1.42 | $t^2$ = | 4 |
| $2\pi=\theta_x$ = | 2.04 | $\sqrt{\theta_x}$ = | 1.43 | $\theta_x^2$ = | 4.15 |
| $\omega_x$ = | 1.02 | $\sqrt{\omega_x}$ = | 1.01 | $\omega_x^2$ = | 1.04 |
| $\alpha_x$ = | .51 | $\sqrt{\alpha_x}$ = | .714 | $\alpha_x^2$ = | .26 |
| $m$ = | 3.68 | $\sqrt{m}$ = | 1.92 | $m^2$ = | 13.5 |
| $I_x$ = | 22.1 | $\sqrt{I_x}$ = | 4.71 | $I_x^2$ = | 49 |
| $\tau_y$ = | 11.25 | $\sqrt{\tau_y}$ = | 3.36 | $\tau_y^2$ = | 126 |
| $W_\theta$ = | 22.9 | $\sqrt{W_\theta}$ = | 4.78 | $W_\theta$ = | 522 |
| $P_\theta$ = | 22.5 | | | | |

HORIZONTAL (X AXIS)

| Symbol | Number Location | Symbol | Number Location | Symbol | Number Location |
|---|---|---|---|---|---|
| $1/f=t$ = | 2.0 | $\sqrt{t}$ = | 1.42 | $t^2$ = | 4 |
| $r_x$ = | 2.45 | $\sqrt{r_x}$ = | 1.565 | $r_x^2$ = | 6.0 |
| $V_x$ = | 1.225 | $\sqrt{V_x}$ = | 1.225 | $V_x^2$ = | 1.5 |
| $\alpha_x$ = | .6125 | $\sqrt{\alpha_x}$ = | 7.81 | $\alpha_x^2$ = | .375 |
| $m$ = | 3.68 | $\sqrt{m}$ = | 1.92 | $m^2$ = | 13.5 |
| $F_x$ = | 2.25 | $\sqrt{F_x}$ = | 1.5 | $F_x^2$ = | 5.07 |
| $W_x$ = | 5.52 | $\sqrt{W_x}$ = | 2.38 | $W_x^2$ = | 30.5 |
| $P_x$ = | 2.76 | $\sqrt{P_x}$ = | 1.66 | $P_x^2$ = | 7.6 |
| $f$ = | .5 | $\sqrt{f}$ = | .224 | $f^2$ = | .25 |

RADIAL (TOWARDS CENTER)

| Symbol | Number Location | Symbol | Number Location | Symbol | Number Location |
|---|---|---|---|---|---|
| $t$ = | 2 | $\sqrt{t}$ = | 1.42 | $t^2$ = | 4 |
| $r_x$ = | 2.45 | $\sqrt{r_x}$ = | 1.565 | $r_x^2$ = | 6.0 |
| $V_y$ = | 2.5 | $\sqrt{V_y}$ = | 1.58 | $V_y^2$ = | 6.25 |
| $\alpha_n$ = | 2.55 | $\sqrt{\alpha_n}$ = | 1.6 | $\alpha_n^2$ = | 6.5 |
| $m$ = | 3.68 | $\sqrt{m}$ = | 1.92 | $m^2$ = | 13.5 |
| $F_n$ = | 9.4 | $\sqrt{F_n}$ = | 3.06 | $F_n^2$ = | 88.5 |
| $W_n$ = | 23.0 | $\sqrt{W_n}$ = | 4.8 | $W_y^2$ = | 530 |
| $P_n$ = | 11.5 | $\sqrt{P_n}$ = | 3.4 | $P_n^2$ = | 132 |

VERTICAL (Y AXIS)

| Symbol | Number Location | Symbol | Number Location | Symbol | Number Location |
|---|---|---|---|---|---|
| $t$ = | 2.0 | $\sqrt{t}$ = | 1.42 | $t^2$ = | 4 |
| $r_y$ = | 5.0 | $\sqrt{r_y}$ = | 2.236 | $r_y^2$ = | 25 |
| $V_y$ = | 2.5 | $\sqrt{V_y}$ = | 1.58 | $V_y^2$ = | 6.25 |
| $\alpha_y$ = | 1.12 | $\sqrt{\alpha_y}$ = | 1.12 | $\alpha_y^2$ = | 1.56 |
| $m$ = | 3.68 | $\sqrt{m}$ = | 1.92 | $m^2$ = | 13.5 |
| $F_y$ = | 4.6 | $\sqrt{F_y}$ = | 2.14 | $F_y^2$ = | 21.2 |
| $W_y$ = | 23.0 | $\sqrt{W_y}$ = | 4.8 | $W_y^2$ = | 530 |
| $P_y$ = | 11.5 | $\sqrt{P_y}$ = | 3.4 | $P_y^2$ = | 132 |

In utilizing a qualitative slide rule for mechanical problems, the following formulas are cited as examples. Again the symbol on the right of the formula may be the unknown. Utilizing a slide rule in a conventional manner for the terms on the left, the unknown quality may be found.

*Mechanical examples*

$\dfrac{r}{t}=V$      $V_y\omega_x=a_n$ $at=V$      $\dfrac{V^2_y}{r_x}=a_n$ $1/2\ at^2=r$      $\omega^2_x r_x=a_n$ $\sqrt{2ar}=V$      $4\pi^2 f^2 r_x=a_n$ $\sqrt{2\dfrac{r}{a}}=t$      $\dfrac{4\pi^2 r_x}{T^2}=a_n$ $\sqrt{2gh}=V$      $2\sqrt{\dfrac{r_x}{a_n}}=t$ $\dfrac{V^2}{g}\sin 2\alpha=r$      $mr_x\omega_x^2=F_n$ $\dfrac{V^2\sin^2\alpha}{2g}=r$      $\dfrac{1}{2\pi}\sqrt{\dfrac{F_n}{mr_x}}=f$ $1/2\ mV^2=W$      $\dfrac{d\theta_x}{dt}=x$ $ma_x=F$      $\dfrac{d\omega_x}{dt}=x$

Mechanical examples.—Continued $$\frac{Gm_1m_2}{r_x^2} = F$$

$$l_x\alpha_x = \tau_y$$

$$\tau_y t = p\theta$$

$$l_x\omega_x = M\theta$$

$$\tau_y\theta_x = W_y$$

$$1/2 l_x\omega_x^2 = F_x$$

$$2\pi\sqrt{\frac{x}{ma_n r_x}}$$

$$\frac{l_x}{mr_x} = r_x$$

$$\frac{2\pi}{t}\tau_y = P_y$$

In considering the heat field, the following symbols are defined:

$r$ = distance, or length
$t$ = time
$F$ = force
$Vol$ = volume
$\begin{cases} n \\ s \\ k \\ \text{Mole} \end{cases}$ entropy = 5

Referring to FIGURE 3, a qualitative slide rule 22 relating to heat parameters includes elements 24 and 26 slidably mounted with respect to each other.

The embodiment of FIGURE 3 operates along the same principles as those described in connection with FIGURES 1 and 2 except that the parameters or qualities considered are related to heat.

The following table illustrates the parameters involved, their appropriate symbols and their number locations on a conventional slide rule.

*Tables relating to heat field*

| Symbol | Number Location | Symbol | Number Location | Symbol | Number Location |
|---|---|---|---|---|---|
| r = | 2.45 | $\sqrt{r}$ = | 1.565 | $r^2$ = | 6.0 |
| t = | 2.0 | $\sqrt{t}$ = | 1.42 | $t^2$ = | 4 |
| F = | 2.25 | $\sqrt{F}$ = | 1.5 | $F^2$ = | 5.07 |
| Pressure = | 3.75 | $\sqrt{\text{Pressure}}$ = | 1.94 | Pressure $^2$ = | 14.0 |
| Vol = | 14.7 | $\sqrt{\text{Vol}}$ = | 3.84 | Vol $^2$ = | 216 |
| W = Heat = | 5.52 | $\sqrt{W}$ = | 2.38 | $W^2$ = | 30.5 |
| Θ = S = K = Mole or Mass. = | 5 | $\sqrt{K}$ = | 2.236 | $K^2$ = | 25 |
| Θ = Temp. = | 1.105 | $\sqrt{T}$ = | 1.05 | $T^2$ = | 1.21 |
| h = | 11.04 | $\sqrt{h}$ = | 3.33 | $h^2$ = | 122 |
| Flux = | 46 | $\sqrt{\text{Flux}}$ = | .679 | Flux $^2$ = | .211 |
| c = Vel = | 1.225 | $\sqrt{\text{Vel}}$ = | 1.11 | Vel $^2$ = | 1.5 |
| $n_o$ = | .068 | $\sqrt{n_o}$ = | .0261 | $n_o^2$ = | .00346 |
| P = | 2.76 | $\sqrt{P}$ = | 1.66 | $P^2$ = | 7.6 |

The following formulas are given as illustrations of some of the problems which may be solved with a heat qualitative slide rule embodying the present invention.

$$\frac{1}{m}\frac{dH}{dt} = c$$

$$m\Delta t = H$$

$$\left(\frac{2\pi^5}{15}\right)\frac{kT^4}{h^3 c^2} = \text{Flux } X$$

$$n_o kT = \text{Pressure}$$

$$\frac{pV}{nT} = R \text{ (constant)}$$

It has been seen that the present invention has provided a novel qualitative slide rule which makes it possible for students, engineers or scientists to quickly solve for unknown qualitative parameters. Even persons of limited mechanical background are capable of solving qualitative equations with the present invention. This permits textbooks and technical articles to be read more easily.

The present invention makes it possible to check the accuracy of certain formulas at various steps. Errors in calculations performed in research and development work for example, may be quickly detected by utilizing the present invention to check the formula at various steps.

What is claimed is:

1. A qualitative slide rule comprising a pair of elements including indicia thereon, said indicia being located on said elements in a predetermined order and at a predetermined spacing, said indicia corresponding to qualitative parameters representing characteristics of physical entities, said pair of elements being movable with respect to each other to align the indicia of two selected qualitative parameters to provide an indication of a third qualitative parameter, said predetermined order and spacing being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron in kilograms;

where $x_2$ which has a numerical value $r_2$ for a root, in a physical sense is equivalent to the velocity of light in meters per second;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass in kilograms of a proton.

2. A qualitative slide rule comprising a pair of flat elongated elements slidably mounted with respect to each other, each of said elements including a plurality of symbols thereon representative of qualitative parameters, said qualitative parameters representing characteristics of physical entities, said symbols being in a predetermined spaced relationship and order with respect to each other, and means for aligning a selected symbol of one with a selected symbol of the other of said pair of elements, the alignment of two symbols relating to two selected known qualitative parameters producing an indication of a third unknown qualitative parameter, said predetermined spacing relationship and order being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron in kilograms;

where $x_2$ which has a numerical value $r_2$ for a root, in a physical sense is equivalent to the velocity of light in meters per second;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass in kilograms of a proton.

3. A device for determining the quality of an unknown function comprising a plurality of elements having indicia thereon representative of a plurality of qualitative functions said indicia being arranged in a predetermined order and spaced relationship, said elements being movable with respect to each other to align indicia representative of one qualitative function on one of said elements with indicia representative of a qualitative function on another of said elements whereby the quality of said unknown function may be visually observed, said predetermined order and spaced relationship being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron in kilograms;

where $x_2$ which has a numerical value $r_2$ for a root, in a physical sense is equivalent to the velocity of light in meters per second;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass in kilograms of a proton.

4. A qualitative slide rule comprising first and second flat elongated elements slidably mounted with respect to each other, a plurality of similar symbols representing qualitative parameters included on said first and second elements, the symbol locations on said first element corresponding to the symbol locations of said second element, the symbols of said first element being disposed to be selectively aligned with the symbols of said second element, and the symbols on each of said first and second elements being in a predetermined order and spaced relationship with respect to one another to permit multiplication or division of two known qualitative parameters to be performed by moving the relative positions of said first and second elements with respect to each other whereby a resulting unknown qualitative parameter may be visually observed on said qualitative slide rule, said predetermined order and spaced relationship being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron in kilograms;

where $x_2$ which has a numerical value $r_2$ for a root, in a physical sense is equivalent to the velocity of light in meters per second;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass in kilograms of a proton.

5. A device for determining the quality of an unknown function comprising a plurality of elements including indicia thereon representing qualitative functions, said qualitative functions representing characteristics of physical entities, said indicia being arranged in a predetermined order, said elements being manipulable by an operator so that movement of certain selected elements representing known qualitative functions results in the manifestation of indicia representing said unknown function, said predetermined order of said indicia being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron in kilograms;

where $x_2$ which has a numerical value $r_2$ for a root, in a physical sense is equivalent to the velocity of light in meters per second;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass in kilograms of a proton.

6. A device for determining the quality of an unknown function comprising a plurality of elements including indicia thereon representing qualitative functions, said qualitative functions representing characteristics of physical entities, said indicia being arranged in a predetermined order, said elements being manipulable by an operator so that movement of certain selected elements representing known qualitative functions results in the manifestation of indicia representing said unknown function, said predetermined order of said indicia being determined by the following formula:

$$f(x) = (x_1 - r_1)(x_2 - r_2) \ldots (x_n - r_n) = 0$$

where $x_1$ which has a numerical value $r_1$ for a root, in a physical sense is equivalent to the mass of an electron;

where $x_2$ which has a numerical value $r_2$ for a root, in a physical sense is equivalent to the velocity of light;

where $x_3$ to $x_{n-1}$ which have numerical values from $r_3$ to $r_{n-1}$ as determined by solving physical equations (laws) simultaneously, in a physical sense are equivalent to specific known physical values;

where $x_n$ which has a numerical value $r_n$ for a root, in a physical sense is equivalent to the mass of a proton.

7. A device for determining the quality of an unknown function comprising a plurality of elements including indicia thereon representing qualitative functions, said qualitative functions representing characteristics of physical entities, said indicia being arranged in a predetermined order, said elements being manipulable by an operator so that movement of certain selected elements representing known qualitative functions results in the manifestation of indicia representing said unknown function, said predetermined order of said indicia being determined by the following formula:

$$f(x) = (x_1-r_1)(x_2-r_2) \ldots (x_i-r_i) \ldots (x_n-r_n) = 0$$

where $x_1$ is a physical quality which has an arbitrarily assigned numerical value $r_1$ for a root;

where $x_2$ is another physical quality which has an arbitrarily assigned numerical value $r_2$ for a root;

where $x_i$ is still another physical quality which has an arbitrarily assigned numerical value $r_i$ for a root;

where $x_{i+1}$ to $x_n$ are physical qualities to which numerical values $r_{i+1}$ to $r_n$ for roots correspond, which values are determined by solving simultaneously physical equations (laws) relating $x_{i+1}$ through $x_n$ to $x_1$ through $x_i$, and which values are numerically consistent therewith.

No references cited.

RICHARD B. WILKINSON, *Primary Examiner.*